(12) United States Patent
Kreuzer

(10) Patent No.: US 6,464,252 B1
(45) Date of Patent: Oct. 15, 2002

(54) VEHICULAR IMPACT PROTECTION DEVICE

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/453,133

(22) Filed: Dec. 2, 1999

(30) Foreign Application Priority Data

Dec. 3, 1998 (DE) ..................................... 298 21 621 U

(51) Int. Cl.⁷ ................................................ B60R 21/16
(52) U.S. Cl. .................. 280/731; 280/729; 280/150 B; 280/743.1
(58) Field of Search .............................. 280/731, 743.1, 280/743 R, 729

(56) References Cited

U.S. PATENT DOCUMENTS

| 3,893,703 A | * | 7/1975 | Chika ..................... 280/150 B |
| 4,773,673 A | * | 9/1988 | Sakurai ..................... 280/732 |
| 5,078,423 A | * | 1/1992 | Fujita ..................... 280/743 |
| 5,310,214 A | * | 5/1994 | Cuevas ..................... 280/729 |
| 5,358,273 A | * | 10/1994 | Onishi et al. ........... 280/743 R |
| 5,398,963 A | | 3/1995 | Föhl |
| 5,456,493 A | * | 10/1995 | Bauer et al. ............. 280/743.1 |
| 6,042,147 A | * | 3/2000 | Nishijima et al. ........ 280/743.1 |
| 6,050,596 A | * | 5/2000 | Boerger ..................... 280/729 |

FOREIGN PATENT DOCUMENTS

| DE | 4307969 | 9/1994 |
| DE | 9409404 | 11/1995 |

* cited by examiner

*Primary Examiner*—Lanna Mai
*Assistant Examiner*—Paul Royal, Jr.
(74) *Attorney, Agent, or Firm*—Tarolli, Sundheim, Covell, Tummino & Szabo L.L.P.

(57) ABSTRACT

An impact protection device for arrangement in a steering wheel of a truck vehicle is provided. The steering wheel has a rim that is located in a plane inclined at an angle of less than 45° to a horizontal plane. The device has an inflatable gas bag mounted in a folded condition and an inflator activatable as a function of vehicle deceleration. The gas bag, in an inflated condition, has the shape of a mushroom with an annular outer edge portion engaging about and behind said steering wheel rim.

3 Claims, 1 Drawing Sheet

VEHICULAR IMPACT PROTECTION DEVICE

TECHNICAL FIELD

Figure 1:
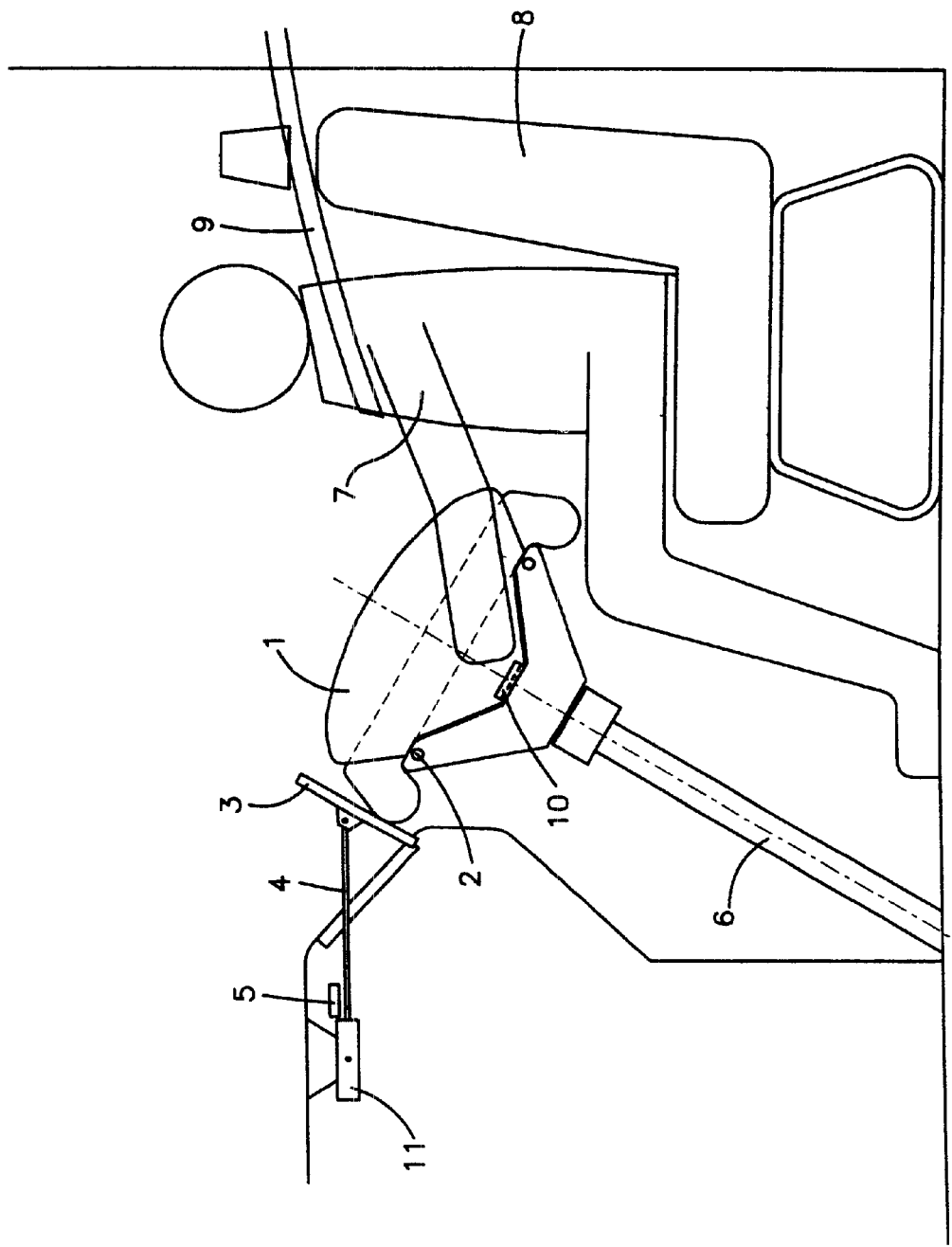

The present invention relates to an impact protection device for arrangement the steering wheel of a truck vehicle. In a truck vehicle, the steering wheel has a rim that is typically located in a plane inclined at an angle of less than 45° to the vehicle longitudinal axis or to a horizontal plane.

BACKGROUND OF THE INVENTION

Impact protection with an inflatable airbag has been known for arrangement in passenger car steering wheels since many years and have since become standard equipment on modern passenger cars.

Steering wheel air bags are being conceived and offered to an increasing extent also for heavy commercial vehicles, where the steering column is usually arranged substantially more inclined than in the case of passenger cars, resulting in a less inclined orientation of the steering wheel rim. Under these conditions, a conventional airbag system would fail to provide an optimum protection. In fact, in the case of passenger car steering wheels the inflated airbag attains a shape in which the impact surface area is located roughly parallel to rim of the steering wheel. This impact surface area is oriented approximately perpendicular to the impact direction of the upper part of the body of the passenger car driver so that the maximum possible impact surface area and thus best-possible impact protection is achievable in an accident situation.

Such an airbag system, when used in a commercial vehicle steering wheel, would result in an impact surface area of the gas or air bag oriented at a more or less greater angle to the upper part of the body of the driver in impact therewith and which in an accident situation would first come into contact at the bottom before progressively increasing contact upwards. Such an impact response would result, on the one hand, in the impact surface area being initially relatively small and, on the other, the inflated gas bag being displaced in the direction of vehicle travel, thus resulting in the danger of the driver impacting the lower part of the steering wheel, i.e. achieving protection only to an exceedingly deficient degree.

BRIEF SUMMARY OF THE INVENTION

The present invention provides an improved impact protection device for use in the steering wheel rim of a heavy commercial vehicle. According to the invention, the device comprises an inflatable gas bag which, in an inflated condition, assumes the shape of a mushroom with an annular outer edge portion engaging about and behind the steering wheel rim.

The shape of an inflated gas bag depends on the shape of the fabric portions employed and on the arrangement of internal tethers. Accordingly, the shape of the inflated gas bag may be influenced to a major extent, whereby an optimized shape of the inflated gas bag can be easily established by trial and error.

By configuring the gas bag so that it assumes the shape of a mushroom in accordance with the invention when inflated this achieves, for one thing, that the critical lower region of the steering wheel in commercial vehicle steering wheels is covered and, for another, that displacement of the gas bag parallel to the plane of the steering wheel rim is prevented.

In another aspect of the invention, an abutment member activatable together with the gas bag is provided which is instantly movable from a retracted position into an activated position and which in the activated position prevents displacement of the gas bag parallel and relative to the steering wheel rim. Preferably, a pyrotechnic drive is used for instantly moving the abutment member to its activated position.

DESCRIPTION OF PREFERRED EMBODIMENT

Referring now to FIG. 1 there is illustrated schematically simplified one embodiment of the invention in a side view. An inflator 10 of a type generally known in the art inflates the gas bag upon the occurrence of a vehicle impact. Reference numeral 1 identifies a gas bag which in the inflated condition assumes the shape of a mushroom surrounding the steering wheel rim 2. Reference numeral 3 identifies an abutment member to be moved from a retracted position, for example in the dashboard, in front of the steering wheel in the direction of travel into an activated position as illustrated, it being in this position. A pyrotechnic drive means 11 is of a type generally known in the art, that it prevents a displacement of the gas bag parallel to the steering wheel rim. In the embodiment as shown the abutment member is moved by means of a pyrotechnically driven rod 4 from the retracted position into the activated position, latching means 5 ensuring that the abutment member 3 is arrested in the activated position.

It is evident that the steering column 6 is inclined much steeper than in the case of a passenger car, resulting in the less inclined arrangement of the steering wheel rim 2. Reference numeral 7 identifies the commercial vehicle driver and 8 the drivers seat and 9 the seat belt.

It is evident from this schematic illustration, realistically depicting the seating position and proportions concerned, that the gas bag surrounding the steering wheel rim 2 in accordance with the invention also offers on completion of inflation good impact protection for the head of the vehicle driver should the seat belt 9 fail to prevent shock forwards movement. Accordingly, an impact protection device for commercial vehicle steering wheels is provided which despite the unfavorable position of the steering column 6 or steering wheel rim 2 offers optimum protection for the vehicle driver.

What is claimed is:

1. Vehicular impact protection apparatus comprising:
   a steering wheel of a truck vehicle having a steering wheel rim located in a plane inclined at an angle of less than 45° to a horizontal plane;
   an inflatable gas bag mounted in a folded condition on said steering wheel;
   means activatable as a function of vehicle deceleration for providing inflation gas to inflate said inflatable gas bag;
   said gas bag, in an inflated condition, having the shape of a mushroom with an annular outer edge portion surrounding said steering wheel rim and extending beyond a plane defined by said steering wheel rim in a generally axial direction parallel to a steering column and perpendicular to the plane of the steering wheel rim;

an abutment member instantly movable from a retracted position into an activated position toward said gas bag to restrict displacement of said gas bag parallel to said steering wheel rim; and a drive means, other than said inflation gas and said means activatable as a function of vehicle deceleration, for moving said abutment member.

2. The vehicular impact protection apparatus as set forth in claim 1, wherein said drive means is a pyrotechnic drive means.

3. The vehicular impact protecting apparatus as set forth in claim 1, wherein said abutment member is a portion of a vehicle dashboard.

* * * * *